(12) United States Patent
Sasaki et al.

(10) Patent No.: US 7,647,470 B2
(45) Date of Patent: Jan. 12, 2010

(54) MEMORY DEVICE AND CONTROLLING METHOD FOR ELONGATING THE LIFE OF NONVOLATILE MEMORY

(75) Inventors: Junko Sasaki, Tokyo (JP); Kenichi Nakanishi, Tokyo (JP); Nobuhiro Kaneko, Kanagawa (JP)

(73) Assignee: Sony Corporation, Tokyo (JP)

( * ) Notice: Subject to any disclaimer, the term of this patent is extended or adjusted under 35 U.S.C. 154(b) by 719 days.

(21) Appl. No.: 11/207,340

(22) Filed: Aug. 19, 2005

(65) Prior Publication Data

US 2006/0047889 A1 Mar. 2, 2006

(30) Foreign Application Priority Data

Aug. 31, 2004 (JP) ............................ P2004-251759

(51) Int. Cl.
*G06F 12/02* (2006.01)
(52) U.S. Cl. .................... 711/203; 711/5; 711/103; 711/170; 711/202; 711/205; 711/206; 711/207
(58) Field of Classification Search ............... 711/5, 711/103, 170, 202, 203, 205–207
See application file for complete search history.

(56) References Cited

U.S. PATENT DOCUMENTS

| 5,603,001 | A | * | 2/1997 | Sukegawa et al. | ............ 711/103 |
|---|---|---|---|---|---|
| 5,652,861 | A | * | 7/1997 | Mayo et al. | ................... 711/157 |
| 5,742,934 | A | * | 4/1998 | Shinohara | ..................... 711/103 |
| 5,978,336 | A | * | 11/1999 | Mine et al. | ............... 369/47.14 |
| 6,381,668 | B1 | * | 4/2002 | Lunteren | ........................ 711/5 |
| 6,675,281 | B1 | * | 1/2004 | Oh et al. | ...................... 711/207 |
| 6,725,322 | B1 | * | 4/2004 | Shiraishi et al. | ............. 711/103 |
| 6,938,144 | B2 | * | 8/2005 | Toyama et al. | .............. 711/206 |
| 7,552,272 | B2 | * | 6/2009 | Gonzalez et al. | ............. 711/103 |
| 2003/0028704 | A1 | * | 2/2003 | Mukaida et al. | ................. 711/5 |
| 2004/0030825 | A1 | * | 2/2004 | Otake et al. | ................... 711/105 |
| 2005/0144361 | A1 | * | 6/2005 | Gonzalez et al. | ............. 711/103 |

FOREIGN PATENT DOCUMENTS

JP 2003-308240 10/2003

OTHER PUBLICATIONS

Kawaguchi et al., "A Flash-Memory Based File System", 1995, USENIX Association.*
"SanDisk Flash Memory Cards Wear Leveling", Oct. 2003, SanDisk Corporation, Doc No. 80-36-00278, pp. 1-6.*

* cited by examiner

*Primary Examiner*—Stephen C Elmore
*Assistant Examiner*—Arpan Savla
(74) *Attorney, Agent, or Firm*—K&L Gates LLP

(57) ABSTRACT

A memory device and controlling method for nonvolatile memory are provided. The memory device and the controlling method for a nonvolatile memory are provided by which, where a file management system wherein there is a tendency that lower logic addresses are used frequently like the MS-DOS is adopted, physical blocks of a flash memory are used in an averaged fashion and the life of the flash memory can be elongated thereby.

40 Claims, 3 Drawing Sheets

FIG. 4

| DIVISIONAL MANAGEMENT NUMBER | PHYSICAL BLOCK RANGE | ALLOCATION INFORMATION (LOGICAL BLOCK RANGE) | DIVISIONAL MANAGEMENT RANGE |
|---|---|---|---|
| 0 | 0~511 | [0~23] (96~334) (1748~1983) | |
| 1 | 512~1023 | [24~47] (335~569) (1512~1747) | |
| 2 | 1024~1535 | [48~71] (570~804) (1276~1511) | |
| 3 | 1536~2047 | [72~95] (805~1039) (1040~1275) | |

FIG. 5

| DIVISIONAL MANAGEMENT NUMBER | PHYSICAL BLOCK RANGE | ALLOCATION INFORMATION (LOGICAL BLOCK RANGE) | DIVISIONAL MANAGEMENT RANGE |
|---|---|---|---|
| 0 | 0~511 | [0~11] [84~95] (96~334) (1748~1983) | |
| 1 | 512~1023 | [12~23] [72~83] (335~569) (1512~1747) | |
| 2 | 1024~1535 | [24~35] [60~71] (570~804) (1276~1511) | |
| 3 | 1536~2047 | [36~47] [48~59] (805~1039) (1040~1275) | | ized
MEMORY DEVICE AND CONTROLLING METHOD FOR ELONGATING THE LIFE OF NONVOLATILE MEMORY

CROSS REFERENCES TO RELATED APPLICATIONS

The present application claims priority to Japanese Patent Application No. 2004-251759 filed in the Japan Patent Office on Aug. 31, 2004, the entire contents of which being incorporated herein by reference.

BACKGROUND

The invention relates to a memory device including a nonvolatile memory wherein data is erased in a unit of a block different from a writing unit of data and also to a controlling method for a nonvolatile memory.

In recent years, a memory device (also referred to as memory card herein) has been spread and used widely as an external storage medium for a host apparatus such as a personal computer, a personal digital assistant, a video camera, a digital camera and a portable telephone set. The memory card is used to store various digital data such as still picture data, moving picture data, audio data and music data.

A host apparatus that utilizes a memory card as an external storage medium sometimes includes an internal storage medium such as a hard disk. Usually, the hard disk is accessed in a logical format from the host apparatus through a file management system such as the MS-DOS (registered trademark). According to the MS-DOS, a cluster is defined as an accessing unit to storage media. In the MS-DOS, an FAT (File Allocation Table) is produced and concatenation relations of data recorded in a recording medium are managed in a unit of a cluster.

Thus, a memory card is known which adopts a popular file management system such as the MS-DOS taking the compatibility with the other recording media into consideration. The memory card adopts a flash memory of the NAND type that is one of nonvolatile memories. The flash memory of the NAND type includes blocks in which data is erased in a batch, and after erasure of data is performed in a unit of a block, new data is written. Such writing of data is performed for each of a plurality of pages provided in the block.

However, in the flash memory of the NAND type, since garbage collection wherein data is erased in a unit of a block is performed, there is a problem that the accessing speed of data is low. Therefore, a memory device wherein blocks of a flash memory are rewritten efficiently to enhance the accessing speed of the flash memory has been proposed and is disclosed in (Japanese Patent Laid-Open No. 2003-308240).

However, according to the flash memory disclosed in (Japanese Patent Laid-Open No. 2003-308240), if the MS-DOS is used as the file management system, there is a tendency that lower logical addresses are used frequently because file allocation information for managing concatenation relations of data is allocated to lower logical addresses. Therefore, lower physical addresses of the flash memory corresponding to the lower logical addresses are used frequently, and there is a problem that the number of times of rewriting of data into part of the physical address region reaches a limit value and rewriting of the flash memory cannot be performed any more although the number of times of rewriting into higher physical addresses is considerably lower than the limit value.

SUMMARY

According to an embodiment, there is provided a memory device and a controlling method for a nonvolatile memory by which, where a file management system having a tendency that lower logic addresses are used frequently like the MOS-DOS is adopted, physical blocks of a flash memory are used in an averaged fashion and the life of the flash memory can be elongated thereby.

According to an embodiment, there is provided a memory device, including a nonvolatile memory having a plurality of physical blocks to which a plurality of successive physical addresses are allocated individually, data being erased for each of the physical blocks, and a memory control section for dividing the physical addresses into a plurality of segments each including a plurality of successive physical addresses, allocating a plurality of successive segment numbers individually corresponding to the divisional segments and controlling operation of the nonvolatile memory, the memory control section including a storage section for storing an address conversion table in which the segment numbers, the physical addresses of the segments to which the segment numbers are allocated and the logical addresses individually allocated to the physical addresses are coordinated with one another, the memory control section being operable to refer to, when any of the logical addresses is designated based on an access instruction to data of the nonvolatile memory, the address conversion table stored in the storage section to specify the segment number of the segment to which the logical address belongs and search for the physical address corresponding to the logical address from among the physical addresses of the segment of the specified segment number to specify the physical address corresponding to the logical address, the memory control section including a logical address dividing section for dividing the logical addresses allocated corresponding to the physical addresses allocated to the nonvolatile memory into a plurality of groups, and a segment setting section for divisionally allocating the logical addresses of the groups obtained by the division by the logical address dividing section individually to a plurality of segments each including a plurality of successive logical addresses.

According to another embodiment, there is provided a controlling method for a nonvolatile memory which has a plurality of physical blocks to which a plurality of successive physical addresses are allocated individually and in which data is erased for each of the physical blocks, including a step of dividing the physical addresses into a plurality of segments each including a plurality of successive physical addresses and allocating a plurality of successive segment numbers individually corresponding to the divisional segments, a step of storing an address conversion table in which the segment numbers, the physical addresses of the segments to which the segment numbers are allocated and the logical addresses individually allocated to the physical addresses are coordinated with one another, a step of referring to, when any of the logical addresses is designated based on an access instruction to data of the nonvolatile memory, the address conversion table stored in a storage section to specify the segment number of the segment to which the logical address belongs and searching for the physical address corresponding to the logical address from among the physical addresses of the segment of the specified segment number to specify the physical address corresponding to the logical address, a logical address dividing step of dividing the logical addresses allocated corresponding to the physical addresses allocated to the nonvolatile memory into a plurality of groups, and a segment setting step of divisionally allocating the logical addresses of the groups obtained by the division at the logical address dividing step individually to a plurality of segments each including a plurality of successive logical addresses.

In the memory device and the controlling method for a nonvolatile memory, a plurality of logical addresses allocated corresponding to a plurality of physical addresses allocated to a nonvolatile memory are divided into a plurality of groups, and the logical addresses of the groups obtained by the division are divisionally allocated to a plurality of segments each including a plurality of successive logical addresses.

Accordingly, since the logical addresses of that group which has a comparatively high accessing frequency and the logical addresses of that group which has a comparatively low accessing frequency are allocated dispersedly to the different segments, the accessing frequencies to the segments become averaged. Consequently, the life of the nonvolatile memory can be elongated.

According to a further embodiment, there is provided a memory device, including a nonvolatile memory having a plurality of physical blocks to which a plurality of successive physical addresses are allocated individually, data being erased for each of the physical blocks, and a memory control section for dividing the physical addresses into a plurality of segments each including a plurality of successive physical addresses, allocating a plurality of successive segment numbers individually corresponding to the divisional segments and controlling operation of the nonvolatile memory, the memory control section including a storage section for storing an address conversion table in which the segment numbers, the physical addresses of the segments to which the segment numbers are allocated and the logical addresses individually allocated to the physical addresses are coordinated with one another, the memory control section being operable to refer to, when any of the logical addresses is designated based on an access instruction to data of the nonvolatile memory, the address conversion table stored in the storage section to specify the segment number of the segment to which the logical address belongs and search for the physical address corresponding to the logical address from among the physical addresses of the segment of the specified segment number to specify the physical address corresponding to the logical address, the memory control section including a logical address dividing section for dividing the logical addresses allocated corresponding to the physical addresses allocated to the nonvolatile memory into a management group including a plurality of logical addresses of lower addresses used for file management of the nonvolatile memory and a user group including a plurality of logical addresses higher than the lower addresses and used to write user data therein, and a management segment setting section for divisionally allocating the logical addresses of the management group and the user group obtained by the division by the logical address dividing section individually to a plurality of segments each including a plurality of successive logical addresses.

According to a still further embodiment, there is provided a controlling method for a nonvolatile memory which has a plurality of physical blocks to which a plurality of successive physical addresses are allocated individually and in which data is erased for each of the physical blocks, including a step of dividing the physical addresses into a plurality of segments each including a plurality of successive physical addresses and allocating a plurality of successive segment numbers individually corresponding to the divisional segments, a step of storing an address conversion table in which the segment numbers, the physical addresses of the segments to which the segment numbers are allocated and the logical addresses individually allocated to the physical addresses are coordinated with one another, a step of referring to, when any of the logical addresses is designated based on an access instruction to data of the nonvolatile memory, the address conversion table stored in a storage section to specify the segment number of the segment to which the logical address belongs and searching for the physical address corresponding to the logical address from among the physical addresses of the segment of the specified segment number to specify the physical address corresponding to the logical address, a logical address dividing step of dividing the logical addresses allocated corresponding to the physical addresses allocated to the nonvolatile memory into a management group including a plurality of logical addresses of lower addresses used for file management of the nonvolatile memory and a user group including a plurality of logical addresses higher than the lower addresses and used to write user data therein, and a management segment setting step of divisionally allocating the logical addresses of the management group and the user group obtained by the division by the logical address dividing step individually to a plurality of segments each including a plurality of successive logical addresses.

In the memory device and the controlling method for a nonvolatile memory, a plurality of logical addresses allocated corresponding to a plurality of physical addresses allocated to a nonvolatile memory are divided into a management group and a user group, and the logical addresses of the management group and the user group obtained by the division are divisionally allocated to a plurality of segments each including a plurality of successive logical addresses.

Accordingly, since the logical addresses of the management group that has a comparatively high accessing frequency and the logical addresses of the user group that has a comparatively low accessing frequency are allocated to the different segments, the accessing frequencies to the segments become averaged. Consequently, the life of the nonvolatile memory can be elongated.

Additional features and advantages are described herein, and will be apparent from, the following Detailed Description and the figures.

BRIEF DESCRIPTION OF THE FIGURES

FIGS. 3 to 5 are similar views but illustrating a configuration of address conversion tables used in memory devices according to different embodiments of the present invention.

DETAILED DESCRIPTION

While several embodiments of the present invention are described below, according to the present invention, a plurality of physical addresses allocated to a nonvolatile memory are divided into a plurality of segments. Then, a plurality of logical addresses allocated individually corresponding to the physical addresses are divided into a management group to be used for file management and a user group to be used by a user, and a plurality of logical addresses of the management group are divisionally allocated to a plurality of segments.

Further, a plurality of logical addresses of the user group are divided into a plurality of groups, and a plurality of logical addresses of each of the divisional groups are allocated divisionally to a plurality of segments.

In the following, a memory device and a controlling method for a nonvolatile memory according to an embodiment are described with reference to the drawings.

Figure 1:
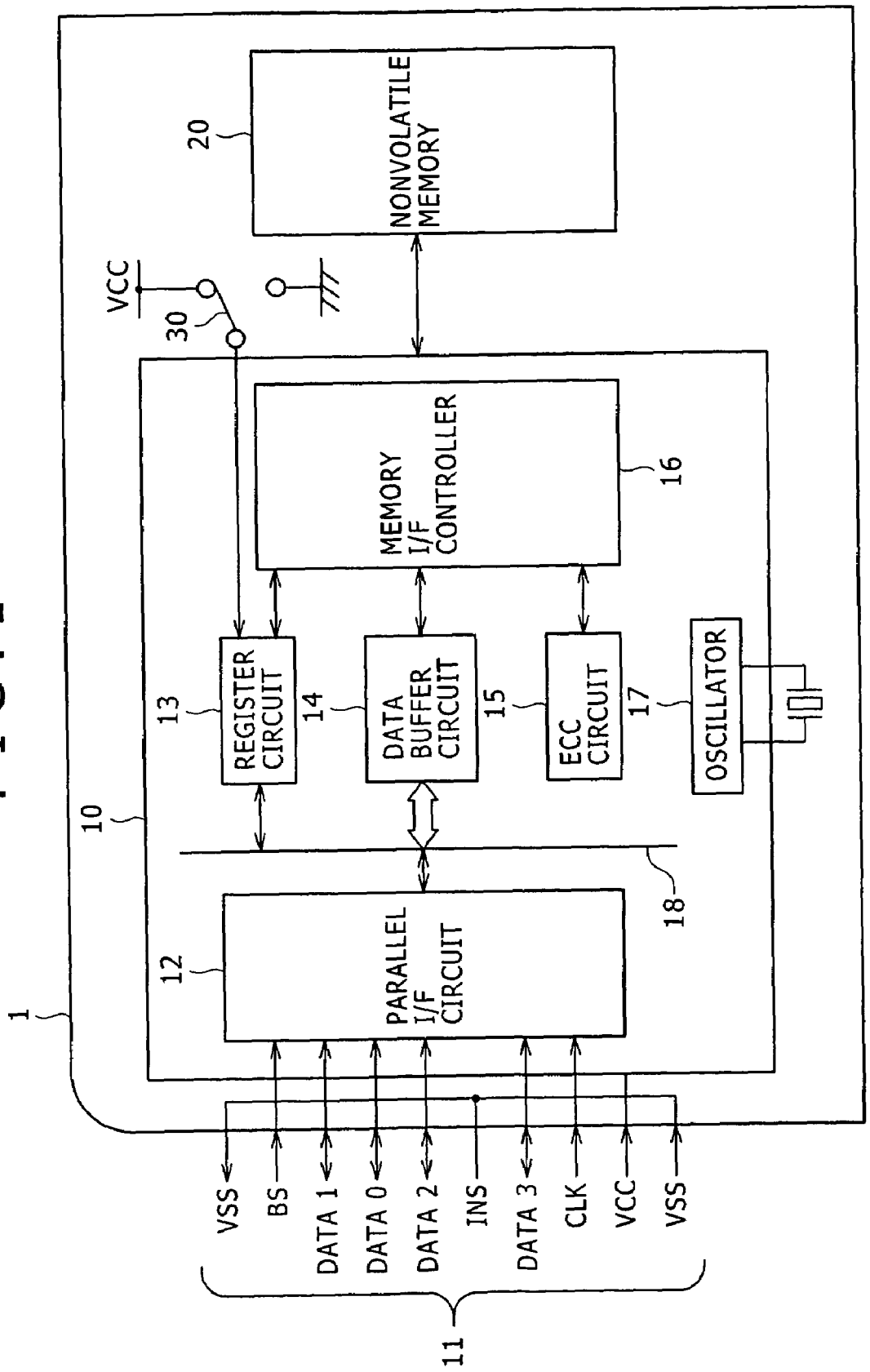
FIG. 1 is a block diagram showing a general configuration of a memory device according to an embodiment of the present invention.

FIG. 1 shows a general configuration of the memory device according to an embodiment.

Referring to FIG. 1, the memory device 1 is formed as a memory device of the card type such as, for example, a memory stick (registered trademark) and is loaded into a host apparatus not shown to store data outputted from the host apparatus. The memory device 1 includes connection terminals 11 connected to ten signal lines connected to the host apparatus, a memory control section 10 connected to the connection terminals 11, a nonvolatile memory 20 controlled by the memory control section 10, and a switch 30 for disabling writing of data into the nonvolatile memory 20.

The memory control section 10 includes a parallel interface (I/F) 12, a register circuit 13, a data buffer circuit 14, an error correcting (ECC) circuit 15, an memory interface (I/F) controller 16, and an oscillator 17.

The parallel interface circuit 12 is connected to the connection terminals 11. The parallel interface circuit 12, register circuit 13, data buffer circuit 14 and ECC circuit 15 are connected to each other by a bus 18. The parallel interface circuit 12, register circuit 13, data buffer circuit 14 and ECC circuit 15 are connected to the memory interface controller 16. The register circuit 13 is connected to the switch 30.

The parallel interface circuit 12 transfers data to and from the host apparatus in accordance with a data transfer protocol of the parallel type. The register circuit 13 stores, for example, control commands transferred from the host apparatus, parameters necessary to execute the control command, internal states of the memory device 1, file management information of the nonvolatile memory 20, and so forth. The register circuit 13 is accessed by both of the host apparatus and the memory interface controller 16.

The data buffer circuit 14 temporarily retains data to be accessed by the nonvolatile memory 20. When data is to be written into the nonvolatile memory 20 from the host apparatus, the write data is transferred from the host apparatus to the data buffer circuit 14, and then the write data stored in the data buffer circuit 14 is read out and written into the nonvolatile memory 20. On the other hand, in order for the host apparatus to read out data from the nonvolatile memory 20, the read data is read out from the nonvolatile memory 20 and stored into the data buffer circuit 14, and then the read data is transferred from the data buffer circuit 14 to the host apparatus.

The ECC circuit 15 adds an error correction code (ECC) to data to be written into the nonvolatile memory 20. Further, the ECC circuit 15 performs an error correction processing for data read out from the nonvolatile memory 20 with an error correction code added to the data read out from the nonvolatile memory 20.

The memory interface controller 16 controls operation of the nonvolatile memory 20 in accordance with a control command stored in the register circuit 13. The memory interface controller 16 performs, for example, communication of data between the nonvolatile memory 20 and the data buffer circuit 14, updating of data stored in the register circuit 13, and so forth. The oscillator 17 generates a clock signal.

The nonvolatile memory 20 is a nonvolatile memory such as one or a plurality of flash memories of the NAND type or the like. In the nonvolatile memory 20, data is erased in a unit of a physical block. The nonvolatile memory 20 has physical blocks to which, for example, physical addresses 0 to 2047 are allocated. Logical blocks having logical addresses 0 to 1983 are allocated to the physical blocks of the physical addresses 0 to 2047. Of the logical addresses 0 to 1983, the logical addresses 0 to 95 form a system area used for file management, and the logical addresses 96 to 1983 form a user area that is used by a user. The system area and the user area are accessed by the host apparatus. However, the system area and the user area form address spaces different from each other and are accessed with control commands different from each other.

In an embodiment, the host apparatus uses, as its operation system, the MS-DOS (Microsoft Disc Operation System) (registered trademark) and manages storage media. The host apparatus uses a logical address to access the memory device 1. The logical address designated by the access instruction is converted into a physical address of the nonvolatile memory 20 by the memory interface controller 16 of the memory device 1. The memory interface controller 16 refers to an address conversion table that coordinates the logical addresses and the physical addresses with each other to perform the address conversion.

It is to be noted that the following description is given on the assumption that the memory control section 10 manages a plurality of physical addresses allocated to the nonvolatile memory 20 and a plurality of logical addresses allocated corresponding to the physical addresses in accordance with the FAT (File Allocation Table) file system which manages the file data body and file location information separately from each other. However, the memory control section 10 may alternatively manage such physical addresses and logical addresses as described above using some other file system, for example, the UDF (Universal Disk Format) file system that is adopted by the DVD-ROM, DVD-RAM, DVD-Video and DVD-R and manages the file data body and file location information separately from each other.

Further, while, in an embodiment, the address conversion table is stored as allocation information that describes concatenation relations of data to be accessed by the host apparatus in the system area of the nonvolatile memory 20, the address conversion table may otherwise be stored externally of the memory device 1.

Figure 2:
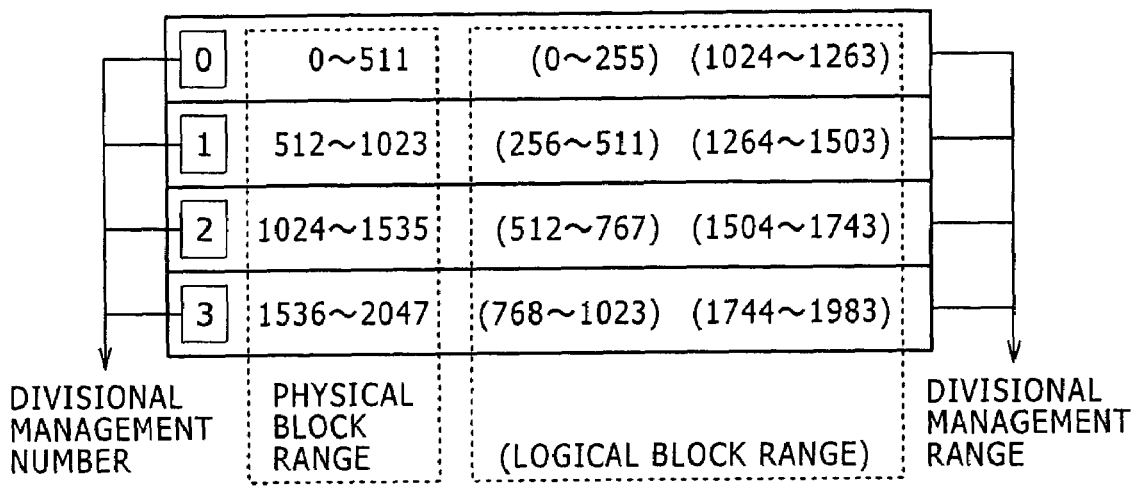
FIG. 2 is a view illustrating a configuration of an address conversion table used in the memory device of FIG. 1.

FIG. 2 illustrates a configuration of the address conversion table in an embodiment.

Referring to FIG. 2, in the address conversion table used in an embodiment, the logical addresses 0 to 1983 are allocated to the physical addresses 0 to 2047. The reason why the number of physical addresses is greater than the number of logical addresses is that the physical blocks include valid blocks and spare blocks. The valid blocks are used to record data of files and so forth. The spare blocks are used to record alternative data for later defective data. If some defective data appears in a valid block, then the logical block of the defective block is written into an unrecorded spare block, and replacement of the logical address is performed. This assures an erasure block and elongates the life of the nonvolatile memory.

The address conversion table in an embodiment is divided into four segments of the physical addresses 0 to 2047 such that a lower segment number is allocated to a segment having lower physical addresses.

Further, in the address conversion table in an embodiment, the logical addresses 0 to 1983 are divided into a group of lower addresses of the logical addresses 0 to 1023 and another group of higher addresses of the logical addresses 1024 to 1983. Further, the logical addresses 0 to 1023 of the group of lower addresses and the logical addresses 1024 to 1083 of the group of higher addresses are individually divided into four segments, and a lower segment number is allocated to a segment having lower logical addresses.

Now, operation of the memory device 1 is described.

When a logical address is designated based on an access instruction of the host apparatus, the memory interface controller 16 refers the address conversion table, and a segment number to which the designated logical address belongs is specified. Then, from among a plurality of physical addresses of the specified segment number, a physical address corresponding to the logical address is searched out to specify the physical address corresponding to the logical address. Accordingly, there is no necessity to search for the designated logical address from among all of the logical addresses of the nonvolatile memory 20, and consequently, the accessing speed of the nonvolatile memory 20 can be enhanced.

In this manner, according to an embodiment, logical addresses are divided into groups of lower addresses and higher addresses. Further, the logical addresses of the lower addresses and the higher addresses are divided into four segments, to which segment numbers are allocated such that a lower segment number is allocated to a segment having lower physical addresses.

Accordingly, even when the lower logical addresses are accessed frequently, since the physical addresses of the segments of the segment numbers 0 to 3 are used in an averaged fashion, an elongated life can be assured for the nonvolatile memory 20.

It is to be noted that, while the dividing number of the physical addresses 0 to 2047 into segments in the description above is four, the dividing number into segments is not limited to four.

Further, while it is described above that the logical addresses 0 to 1983 are divided into two groups including a group of lower addresses and another group of higher addresses, the dividing number of the logical addresses into groups is not limited to two, but the logical addresses may be divided into a greater number of smaller groups.

Where the logical addresses 0 to 1983 are divided into a greater number of smaller groups in this manner, even in such a situation that a small range of the logical addresses is accessed frequently, the physical addresses of the segments of the segment numbers 0 to 3 can be used in a further averaged fashion. Therefore, the life of the nonvolatile memory 20 can be further elongated.

Figure 3:
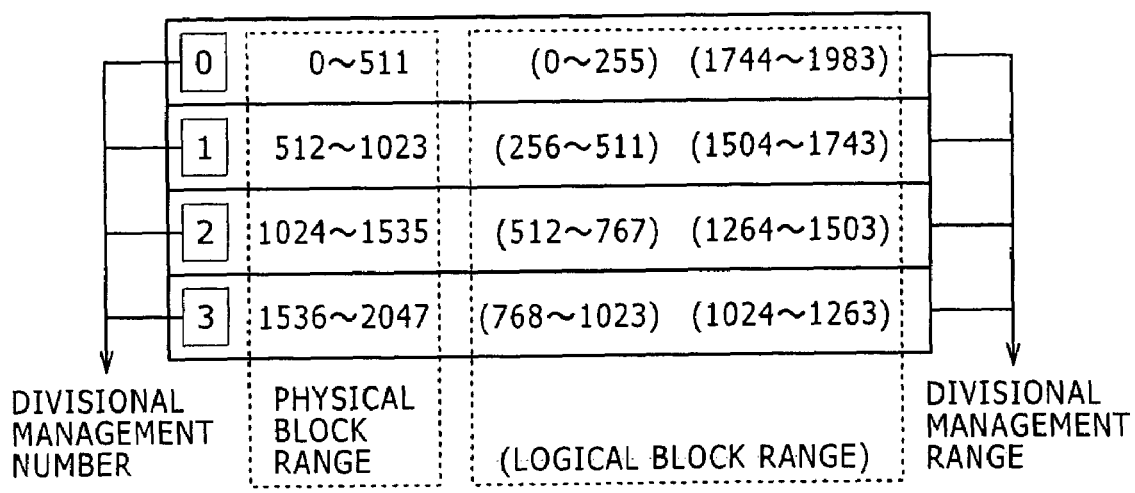

FIG. 3 illustrates a configuration of an address conversion table used in another embodiment.

The memory device according to an embodiment includes the address conversion table illustrated in FIG. 3 in place of the address conversion table used in the First embodiment illustrated in FIG. 2. The configuration of the other part of the memory device is similar to that of the memory device according to an embodiment illustrated in FIG. 1 and described above, and therefore, overlapping description of the same is omitted herein to avoid redundancy.

Referring to FIG. 3, in the address conversion table in an embodiment, physical addresses 0 to 2047 are divided into four segments, and segment numbers are allocated such that a lower segment number is allocated to a segment having lower physical addresses, similarly as in an embodiment. Further, logical addresses 0 to 1983 are divided into a group of lower addresses of the logical addresses 0 to 1023 and another group of higher addresses of the logical address 1024 to 1983.

Further, in the address conversion table in an embodiment, the logical addresses 0 to 1023 of the group of lower addresses and the logical addresses 1024 to 1983 of the group of higher addresses are individually divided into four segments. Further, segment numbers are allocated such that, in the group of lower addresses, a lower segment number is allocated to a segment having lower logical addresses, and in the group of higher addresses, a lower segment number is allocated to a segment having higher logical addresses.

In this manner, according to an embodiment, in one of the lower and higher address groups, a lower segment number is allocated to a segment having lower logical addresses, but in the other of the lower and higher address groups, a lower segment number is allocated to a segment having higher logical addresses.

Accordingly, even if lower logical addresses are accessed frequently, the physical addresses of the segments of the segment numbers 0 to 3 can be used in a further averaged fashion. Consequently, the life of the nonvolatile memory 20 can be further elongated.

It is to be noted that, also in an embodiment, while the dividing number of the physical addresses into segments is four, the dividing number into segments is not limited to four. Further, while it is described above that the logical addresses 0 to 1983 are divided into two groups including a group of lower addresses and another group of higher addresses, the dividing number of the logical addresses into groups is not limited to two, but the logical addresses may be divided into a greater number of smaller groups.

Where the logical addresses 0 to 1983 are divided into a greater number of smaller groups in this manner, even in such a situation that a small range of the logical addresses is accessed frequently, the physical addresses of the segments of the segment numbers 0 to 3 can be used in a further averaged fashion. Therefore, the life of the nonvolatile memory 20 can be further elongated.

FIG. 4 illustrates a configuration of an address conversion table used in a further embodiment.

The memory device according to an embodiment includes the address conversion table illustrated in FIG. 4 in place of the address conversion table used in the First embodiment illustrated in FIG. 2. The configuration of the other part of the memory device according to the Third embodiment is similar to that of the memory device according to the First embodiment illustrated in FIG. 1, and therefore, overlapping description of the same is omitted herein to avoid redundancy.

Referring to FIG. 4, in the address conversion table in an embodiment, physical addresses 0 to 2047 are divided into four segments, and segment numbers are allocated such that a lower segment number is allocated to a segment having lower physical addresses, similarly as described above.

In the address conversion table, logical addresses 0 to 1983 are divided into a system area of the logical addresses 0 to 95 and a user area of the logical addresses 96 to 1983. Further, the logical addresses 96 to 1983 of the user area are divided into a group of lower addresses of the logical addresses 96 to 1039 and another group of higher addresses of the logical address 1040 to 1983.

In the address conversion table, the logical addresses 0 to 95 of the system area, the logical addresses 96 to 1039 of the group of lower addresses and the logical addresses 1040 to 1983 of the group of higher addresses are individually divided into four segments. Further, segment numbers are allocated such that, in the system area, a lower segment number is allocated to a segment having lower logical addresses, and in the group of lower addresses, a lower segment number is allocated to a segment having lower logical addresses while, in the group of higher addresses, a lower segment number is allocated to a segment having higher logical addresses.

In this manner, according to an embodiment, the logical addresses are divided into a system area and a user area. Then, the logical addresses of the system area are divided into four segments, and a lower segment number is allocated to a segment having lower logical addresses.

Therefore, the logical addresses of the system area that exhibits the highest accessing frequency can be dispersed to the four segments. Accordingly, since the physical addresses of the segments of the segment numbers 0 to 3 can be used in a further averaged fashion, the life of the nonvolatile memory 20 can be further elongated.

Meanwhile, the logical addresses of the user area are divided into lower and higher address groups, and the logical addresses of the lower and higher addresses are individually divided into four segments. Further, segment numbers are allocated such that, in one of the lower and higher address groups, a lower segment number is allocated to a segment having lower physical addresses, but in the other of the lower and higher address groups, a lower segment number is allocated to a segment having higher physical addresses.

Accordingly, even if lower logical addresses of the user area are accessed frequently, the physical addresses of the segments of the segment numbers 0 to 3 can be used in a further averaged fashion. Consequently, the life of the nonvolatile memory 20 can be further elongated.

It is to be noted that, also in the present Third embodiment, while the dividing number of the physical addresses into segments is four, the dividing number into segments is not limited to four. Further, while it is described above that the group of the logical addresses 96 to 1983 is divided into two groups including a group of lower addresses and another group of higher addresses, the dividing number of the logical addresses into groups is not limited to two of the lower address group and the higher address group, but the logical addresses 96 to 1983 may be divided into a greater number of smaller groups.

Where the logical addresses 96 to 1983 are divided into a greater number of smaller groups in this manner, even in such a situation that a small range of the logical addresses is accessed frequently, the physical addresses of the segments of the segment numbers 0 to 3 can be used in a further averaged fashion. Therefore, the life of the nonvolatile memory 20 can be further elongated.

FIG. 5 illustrates a configuration of an address conversion table used in another embodiment.

The memory device according to an embodiment includes the address conversion table illustrated in FIG. 5 in place of the address conversion table in the Third embodiment illustrated in FIG. 4. The configuration of the other part of the memory device is similar to that of the memory device according to an embodiment illustrated in FIG. 1 and described above, and therefore, overlapping description of the same is omitted herein to avoid redundancy.

Referring to FIG. 5, in the address conversion table, the logical addresses 0 to 95 of the system area in the Third embodiment is divided into a group of lower addresses of the logical addresses 0 to 47 and another group of higher addresses of the logical addresses 48 to 95. Further, the logical addresses of the lower and higher address groups are individually divided into four segments. Further, segment numbers are allocated such that, in one of the lower and higher address groups, a lower segment number is allocated to a segment having lower physical addresses, and in the other of the lower and higher address groups, a lower segment number is allocated to a segment having higher physical addresses.

In this manner, according to an embodiment, the logical addresses of the system area which exhibits the highest accessing frequency are divided into groups of lower and higher addresses similar to those of the logical addresses of the user area, and segment numbers are allocated such that, in one of the lower and higher address groups, a lower segment number is allocated to a segment having lower physical addresses, and in the other of the lower and higher address groups, a lower segment number is allocated to a segment having higher physical addresses.

Accordingly, since the physical addresses of the segments of the segment numbers 0 to 3 can be used in a further averaged fashion, the life of the nonvolatile memory 20 can be further elongated.

It is to be noted that, while the memory control section 10 is provided in the memory device 1 such that operation of the nonvolatile memory 20 is controlled by the memory control section 10, if the memory device does not include the memory control section 10, then a function for implementing the memory control section 10 can be provided as hardware or software in the host apparatus.

Further, while the address conversion table is stored, as allocation information which describes concatenation relations of data to be accessed by the host apparatus, in physical blocks corresponding to a system area of the nonvolatile memory 20, the storage section for storing allocation information may be provided separately from the nonvolatile memory 20.

Where the storage section for allocation information is provided in the nonvolatile memory 20, since it can be accessed similarly to data of the user area by the memory interface controller 16, the control is facilitated. On the other hand, where the storage section is provided separately from the nonvolatile memory 20, for example, the storage section may be configured such that there is no limitation to the number of times of rewriting thereof while only the user data can be stored into the nonvolatile memory 20 thereby to elongate the life of the nonvolatile memory 20.

Further, while the dividing number into segments is four in an embodiment, the dividing number into segments is not limited to four.

Further, while, in an embodiment, the logical addresses 0 to 95 of the system area are divided into two groups of lower and higher addresses and the logical addresses 96 to 1983 of the user area are divided into two groups including a group of lower addresses and another group of higher addresses, the dividing number of the system area or the user area into groups is not limited to the two groups of lower addresses and higher addresses, but the system area or the user area may otherwise be divided more finely into a greater number of groups.

Where the logical addresses 0 to 95 of the system area or the logical addresses 96 to 1983 of the user area are divided more finely into a greater number of groups in this manner, even in such a situation that a narrow range of the logical addresses is accessed frequently, the physical addresses of the segments of the segment numbers 0 to 3 can be used in a further averaged fashion. Consequently, the life of the nonvolatile memory 20 can be further elongated.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A memory device storing instructions, the memory device comprising:
   a nonvolatile memory having a plurality of physical blocks to which a plurality of successive physical addresses are allocated individually, data being erased for each of the physical blocks; and
   a controller which executes the instructions that:
   (a) divide the plurality of successive physical addresses into a first segment including a first plurality of successive physical addresses and a second segment including a second plurality of successive physical addresses;
   (b) allocate:
      (i) a first segment number individually corresponding to the first segment; and
      (ii) a second segment number individually corresponding to the second segment; and
   (c) control operation of said nonvolatile memory;
   (d) store an address conversion table in which:
      (i) the first segment number and the second segment number;
      (ii) the first plurality of successive physical addresses and the second plurality of physical addresses; and
      (iii) logical addresses individually allocated to the first plurality of successive physical addresses and the second plurality of successive physical addresses are coordinated with one another;
   (e) refer to, when any of the logical addresses is designated based on an access instruction to data of said nonvolatile memory, said address conversion table to:
      (i) specify the segment number of the segment to which the logical address belongs; and
      (ii) search for the physical address corresponding to the logical address from among the physical addresses of the segment of the specified segment number to specify the physical address corresponding to the logical address;
   (f) divide the logical addresses into:
      (i) a first address group including:
         (A) a first lower address group including a first plurality of the logical addresses, said first plurality of logical addresses being equal to or lower than a first predetermined logical address; and
         (B) a first higher address group including a second plurality of the logical addresses, said second plurality of logical addresses being higher than the first predetermined logical address; and
      (ii) a second address group including:
         (A) a second lower address group including a third plurality of logical addresses, said third plurality of logical addresses being equal to or lower than a second predetermined logical address and being higher than the first plurality of logical addresses and the second plurality of logical addresses; and
         (B) a second higher address group including a fourth plurality of the logical addresses, said fourth plurality of logical addresses being higher than the second predetermined logical address and being higher than the first plurality of logical addresses and the second plurality of logical addresses; and
   (g) divisionally allocate:
      (i) the first lower address group of the first address group to the first segment;
      (ii) the first higher address group of the first address group to the second segment; and
      (iii) the second lower address group of the second address group to one of the first segment and the second segment, wherein:
         (A) if said second lower address group is divisionally allocated to the first segment, the second higher address group is divisionally allocated to the second segment; and
         (B) if said second lower address group is divisionally allocated to the second segment, the second higher address group is divisionally allocated to the first segment.

2. The memory device of claim 1, wherein:
   the first predetermined logical address is a first medium value of the logical addresses divided into the first address group; and
   the second predetermined logical address is a second medium value of the logical addresses divided into the second address group.

3. The memory device of claim 1, wherein when executed by the controller, the instructions cause the controller to divide the physical addresses allocated to said nonvolatile memory in an ascending order into a plurality of segments such that a lower segment number is allocated to a segment having a lower physical address.

4. The memory device of claim 1, wherein said first segment number is lower than said second segment number.

5. The memory device of claim 1, wherein when executed by the controller, the instructions cause the controller to manage the physical addresses allocated to said nonvolatile memory and the logical addresses allocated corresponding to the physical addresses in accordance with a file system which divisionally manages a file data body and file location information including the File Allocation Table file system and the Universal Disk Format file system.

6. The memory device of claim 1, wherein when executed by the controller, the instructions cause the controller to store said address table in one of said physical blocks of said nonvolatile memory.

7. A controlling method for a nonvolatile memory which has a plurality of physical blocks to which a plurality of successive physical addresses are allocated individually and in which data is erased for each of the physical blocks, the method comprising:
   dividing the plurality of successive physical addresses into a first segment including a first plurality of successive physical addresses and a second segment including a second plurality of successive physical addresses;
   allocating: (i) a first segment number individually corresponding to the first segment; and (ii) a second segment number individually corresponding to the second segment;
   storing an address conversion table in which: (a) the first segment number and the second segment number; (b) the first plurality of successive physical addresses and the second plurality of successive physical addresses; and (c) logical addresses individually allocated to the first plurality of successive physical addresses and the second plurality of successive physical addresses are coordinated with one another;
   referring to, when any of the logical addresses is designated based on an access instruction to data of said nonvolatile memory, said address conversion table stored in a storage section to: (a) specify the segment number of the segment to which the logical address belongs; and (b) search for the physical address corresponding to the logical address from among the physical addresses of the segment of the specified segment number to specify the physical address corresponding to the logical address;

dividing the logical addresses into:
(a) a first address group including: (i) a first lower address group including a first plurality of logical addresses, said first plurality of logical addresses being equal to or lower than a first predetermined logical address; and (ii) a first higher address group including a second plurality of the logical addresses, said second plurality of logical addresses being higher than the first predetermined logical address; and
(b) a second address group including: (i) a second lower address group including a third plurality of logical addresses, said third plurality of logical addresses being equal to or lower than a second predetermined logical address and being higher than the first plurality of logical addresses and the second plurality of logical addresses; and (ii) a second higher address group including a fourth plurality of the logical addresses, said fourth plurality of logical addresses being higher than the second predetermined logical address and being higher than the first plurality of logical addresses and the second plurality of logical addresses; and divisionally allocating:
(i) the first lower address group of the first address group to the first segment;
(ii) the first higher address group of the first address group to the second segment; and
(ii) the second lower address group of the second address group to one of the first segment and the second segment, wherein: (A) if said second lower address group is divisionally allocated to the first segment, the second higher address group is divisionally allocated to the second segment; and (B) if said second lower address group is divisionally allocated to the second segment, the second higher address group is divisionally allocated to the first segment.

8. The method of claim 7, wherein:
the first predetermined logical address is a first medium value of the logical addresses divided into the first address group; and
the second predetermined logical address is a second medium value of the logical addresses divided into the second address group.

9. The method of claim 7, further comprising dividing the physical addresses allocated to said nonvolatile memory in an ascending order into a plurality of segments such that a lower segment number is allocated to a segment having a lower physical address.

10. The method of claim 7, wherein the first segment number is lower than the second segment number.

11. The method of claim 7, further comprising managing the physical addresses allocated to said nonvolatile memory and the logical addresses allocated corresponding to the physical addresses in accordance with a file system which divisionally manages a file data body and file location information including the File Allocation Table file system and the Universal Disk Format file system.

12. The method of claim 7, wherein said storage section is provided in one of said physical blocks of said nonvolatile memory.

13. A memory device storing instructions, the memory device comprising:

a nonvolatile memory having a plurality of physical blocks to which a plurality of successive physical addresses are allocated individually, data being erased for each of the physical blocks; and
a controller which executes the instructions that:
(a) divide the plurality of successive physical addresses into a first segment including a first plurality of successive physical addresses and second segment including a second plurality of successive physical addresses;
(b) allocate: (i) a first segment number corresponding to the first segment; and (ii) a second segment number corresponding to the second segment; and
(c) control operation of said nonvolatile memory;
(d) store an address conversion table in which: (i) the first segment number and the second segment number; (ii) the first plurality of successive physical addresses and the second plurality of successive plurality of addresses; and (iii) logical addresses individually allocated to the first plurality of successive physical addresses and the second plurality of successive physical addresses are coordinated with one another;
(e) refer to, when any of the logical addresses is designated based on an access instruction to data of said nonvolatile memory, said address conversion table stored in said storage section to: (i) specify the segment number of the segment to which the logical address belongs; and (ii) search for the physical address corresponding to the logical address from among the physical addresses of the segment of the specified segment number to specify the physical address corresponding to the logical address;
(f) divide the logical addresses into:
(i) a management group including:
(A) a first group of lower addresses including a first plurality of logical addresses used for file management of said nonvolatile memory; and
(B) a first group of higher addresses including a second plurality of logical addresses used for the file management of said nonvolatile memory; and
(ii) a user group including:
(A) a second group of lower addresses including a third plurality of logical addresses, said third plurality of logical addresses being higher than the first plurality of logical addresses and the second plurality of logical address, the third plurality of logical addresses used to write user data therein; and
(B) a second group of higher addresses including a fourth plurality of logical addresses, said fourth plurality of logical addresses being higher than the third plurality of logical addresses; and
(g) divisionally allocate:
(i) said first group of lower addresses to the first segment;
(ii) said first group of higher addresses to the second segment;
(iii) said second group of lower addresses to one of the first segment or the second segment, wherein: (A) if the said second group of lower addresses is divisionally allocated to the first segment, the second group of higher addresses is divisionally allocated to the second segment; and (B) if the said second group of lower addresses is divisionally allocated to the second segment, the second group of higher addresses is divisionally allocated to the first segment.

14. The memory device of claim 13, wherein when executed by the controller, the instructions cause the controller to divide the physical addresses allocated to said nonvolatile memory in an ascending order into a plurality of segments such that a lower segment number is allocated to a segment having a lower physical address.

15. The memory device of claim 13, wherein said first segment number is lower than said second segment number.

16. The memory device of claim 14, wherein when executed by the controller, the instructions cause the controller to:
divide the logical addresses of the management group into a plurality of groups; and
divisionally allocate the logical addresses of the groups to a plurality of segments each including a plurality of successive logical addresses.

17. The memory device of claim 16, wherein when executed by the controller, the instructions cause the controller to:
divide the logical addresses of the management group into a lower management group including a plurality of logical addresses equal to or lower than a predetermined logical address and a higher management group including a plurality of logical addresses higher than the predetermined logical address; and
divisionally allocate the logical addresses of the lower management group and the higher management group to a plurality of segments each including a plurality of successive logical addresses.

18. The memory device of claim 17, wherein the predetermined logical address is a medium value of the logical addresses of the management group.

19. The memory device of claim 17, wherein when executed by the controller, the instructions cause the controller to:
divide the logical addresses of the lower management group and the higher management group individually in an ascending order into a plurality of segments; and
allocate segment numbers such that a lower segment number is allocated to a segment of a lower logical address in each of the lower management group and the higher management group.

20. The memory device of claim 17, wherein when executed by the controller, the instructions cause the controller to:
divide the logical addresses of the lower management group and the higher management group individually in an ascending order into a plurality of segments; and
allocate segment numbers such that a lower segment number is allocated to a segment of a lower logical address in one of the lower management group and the higher management group while a lower segment number is allocated to a segment of a higher logical address in the other of the lower management group and the higher management group.

21. The memory device of claim 14, wherein when executed by the controller, the instructions cause the controller to:
divide the logical addresses of the user group into a lower user group including a plurality of logical addresses equal to or lower than a predetermined logical address and a higher user group including a plurality of logical addresses higher than the predetermined logical address; and
divisionally allocate the logical addresses of the lower user group and the higher user group to a plurality of segments each including a plurality of successive logical addresses.

22. The memory device of claim 21, wherein the predetermined logical address is a medium value of the logical addresses of the user group.

23. The memory device of claim 21, wherein when executed by the controller, the instructions cause the controller to:
divide the logical addresses of the lower user group and the higher user group individually in an ascending order into a plurality of segments; and
allocate segment numbers such that a lower segment number is allocated to a segment of a lower logical address in each of the lower user group and the higher user group.

24. The memory device of claim 21, wherein when executed by the controller, the instructions cause the controller to:
divide the logical addresses of the lower user group and the higher user group individually in an ascending order into a plurality of segments; and
allocate segment numbers such that a lower segment number is allocated to a segment of a lower logical address in one of the lower user group and the higher user group while a lower segment number is allocated to a segment of a higher logical address in the other of the lower user group and the higher user group.

25. The memory device of claim 13, wherein when executed by the controller, the instructions cause the controller to manage the physical addresses allocated to said nonvolatile memory and the logical addresses allocated corresponding to the physical addresses in accordance with a file system which divisionally manages a file data body and file location information including the File Allocation Table file system and the Universal Disk Format file system.

26. The memory device of claim 13, wherein when executed by the controller, the instructions cause the controller to store the address conversion table in the physical block of one of the physical addresses which corresponds to the logical block of one of the logical addresses of said management group.

27. A controlling method for a nonvolatile memory which has a plurality of physical blocks to which a plurality of successive physical addresses are allocated individually and in which data is erased for each of the physical blocks, the method comprising:
dividing the plurality of successive physical addresses into a first segment including a first plurality of successive physical addresses and a second segment including a second plurality of successive physical addresses;
allocating a first segment number corresponding to the first segment, and a second segment number to the second segment;
storing an address conversion table in which: (a) the first segment number and the second segment number; (b) the first plurality of successive physical addresses and the second plurality of successive addresses; and (c) logical addresses individually allocated to the first plurality of physical addresses and the second plurality of physical addresses are coordinated with one another;
referring to, when any of the logical addresses is designated based on an access instruction to data of said nonvolatile memory, said address conversion table stored in a storage section to: (a) specify the segment number of the segment to which the logical address belongs; and (b) search for the physical address corresponding to the logical address from among the physical addresses of the segment of the specified segment number to specify the physical address corresponding to the logical address;

dividing the logical addresses into:
(a) a management group including:
  (i) a first group of lower addresses including a first plurality of logical addresses used for file management of said nonvolatile memory; and
  (ii) a first group of higher addresses including a second plurality of logical addresses used for the file management of said nonvolatile memory; and
(b) a user group including:
  (i) a second group of lower addresses including a third plurality of logical addresses, the third plurality of logical addresses being higher than the first plurality of logical addresses and the second plurality of logical addresses, the third group of plurality of logical addresses used to write user data therein; and
  (ii) a second group of higher addresses including a fourth plurality of logical addresses, said fourth plurality of logical addresses being higher than the third plurality of logical addresses; divisionally allocating:
  (i) said first group of lower addresses to the first segment;
  (ii) said first group of higher addresses to the second segment;
  (iii) said second group of lower addresses to one of the first segment or the second segment, wherein: (A) if the said second group of lower addresses is divisionally allocated to the first segment, the second group of higher addresses is divisionally allocated to the second segment; and (B) if the said second group of lower addresses is divisionally allocated to the second segment, the second group of higher addresses is divisionally allocated to the first segment.

28. The method of claim 27, wherein the physical addresses allocated to said nonvolatile memory are divided in an ascending order into a plurality of segments such that a lower segment number is allocated to a segment having a lower physical address.

29. The method of claim 27, wherein said first segment number is lower than said second segment number.

30. The method of claim 28, further comprising dividing the logical addresses of the management group into a plurality of groups, and a management segment setting step of divisionally allocating the logical addresses of the groups obtained by the division by the management group dividing step to a plurality of segments each including a plurality of successive logical addresses.

31. The method of claim 30, further comprising dividing the logical addresses of the management group into a lower management group including a plurality of logical addresses equal to or lower than a predetermined logical address and a higher management group including a plurality of logical addresses higher than the predetermined logical address, and the management segment setting step divisionally allocates the logical addresses of the lower management group and the higher management group obtained by the division by the management group dividing step to a plurality of segments each including a plurality of successive logical addresses.

32. The method of claim 31, wherein the predetermined logical address is a substantially medium value of the logical addresses of the management group.

33. The method of claim 31, further comprising dividing the logical addresses of the lower management group and the higher management group individually in an ascending order into a plurality of segments and allocating segment numbers such that a lower segment number is allocated to a segment of a lower logical address in each of the lower management group and the higher management group.

34. The method of claim 31, further comprising dividing the logical addresses of the lower management group and the higher management group individually in an ascending order into a plurality of segments and allocating segment numbers such that a lower segment number is allocated to a segment of a lower logical address in one of the lower management group and the higher management group while a lower segment number is allocated to a segment of a higher logical address in the other of the lower management group and the higher management group.

35. The method of claim 28, further comprising dividing the logical addresses of the user group into a lower user group including a plurality of logical addresses equal to or lower than a predetermined logical address and a higher user group including a plurality of logical addresses higher than the predetermined logical address, and a user segment setting step of divisionally allocating the logical addresses of the lower user group and the higher user group obtained by the division by the user group dividing step to a plurality of segments each including a plurality of successive logical addresses.

36. The method of claim 35, wherein the predetermined logical address is a medium value of the logical addresses of the user group.

37. The method of claim 35, further comprising dividing the logical addresses of the lower user group and the higher user group individually in an ascending order into a plurality of segments and allocating segment numbers such that a lower segment number is allocated to a segment of a lower logical address in each of the lower user group and the higher user group.

38. The method of claim 35, further comprising dividing the logical addresses of the lower user group and the higher user group individually in an ascending order into a plurality of segments and allocating segment numbers such that a lower segment number is allocated to a segment of a lower logical address in one of the lower user group and the higher user group while a lower segment number is allocated to a segment of a higher logical address in the other of the lower user group and the higher user group.

39. The method of claim 27, further comprising managing the physical addresses allocated to said nonvolatile memory and the logical addresses allocated corresponding to the physical addresses in accordance with a file system which divisionally manages a file data body and file location information including the File Allocation Table file system and the Universal Disk Format file system.

40. The method of claim 27, wherein said storage section is provided in the physical block of one of the physical addresses which corresponds to the logical block of one of the logical addresses of said management group.

* * * * *